United States Patent [19]

Machida et al.

[11] Patent Number: 5,418,290

[45] Date of Patent: May 23, 1995

[54] STYRENIC BLOCK COPOLYMERS AND PROCESS FOR PRODUCING SAME

[75] Inventors: Shuji Machida; Toshinori Tazaki; Noriyuki Tani, all of Sodegaura, Japan

[73] Assignee: Idemitsu Kosan Co., Ltd., Tokyo, Japan

[21] Appl. No.: 312,759

[22] Filed: Sep. 27, 1994

Related U.S. Application Data

[62] Division of Ser. No. 63,745, May 20, 1993.

[30] Foreign Application Priority Data

May 21, 1992 [JP] Japan ..................... 128596

[51] Int. Cl.$^6$ ............... C08L 53/00; C08F 297/04; C08F 4/76; B32B 27/30
[52] U.S. Cl. .................. 525/88; 525/268; 428/500; 524/505
[58] Field of Search ............. 525/88, 242, 268; 428/500; 524/505

[56] References Cited

U.S. PATENT DOCUMENTS

| | | | |
|---|---|---|---|
| 4,628,072 | 12/1986 | Shiraki | 525/57 |
| 4,836,768 | 6/1989 | Wilson | 428/323 |
| 5,189,125 | 2/1993 | Isihara | 526/160 |
| 5,202,402 | 4/1993 | Funaki | 526/336 |
| 5,250,629 | 10/1993 | Tani et al. | |
| 5,331,057 | 7/1994 | Brekner | 525/289 |
| 5,359,001 | 10/1994 | Epple | 525/97 |
| 5,362,814 | 11/1994 | Machida et al. | |

*Primary Examiner*—Vasu S. Jagannathan
*Attorney, Agent, or Firm*—Oblon, Spivak, McClelland, Maier & Neustadt

[57] ABSTRACT

There are disclosed a styrenic block copolymer having a reduced viscosity of 0.01 to 20 dl/g (0.05 g/l in 1,2,4-trichlorobenzene at 135° C.) which comprises highly syndiotactic styrenic-polymer segments and $10^{-4}$ to 10 mol % of heteroatom-containing styrenic polymer segments; a resin composition comprising the above styrenic block copolymer and a thermoplastic resin, an inorganic filler or an organic filler; a multi-layer material comprising at least one layer composed of the above styrenic block copolymer or the above resin composition; and a process for producing the above styrenic block copolymer which comprises polymerizing a styrenic monomer in the presence of a specific catalyst and adding a heteroatom-containing styrenic monomer to successively proceed with copolymerizaiton reaction. The above-disclosed styrenic block copolymer and the resin composition exhibit excellent compatibility and adhesivenesss, and the multi-layer material is expected to find a wide range of applications in automobile parts, electrical and electronic parts as well as film, sheet, etc.

8 Claims, No Drawings

STYRENIC BLOCK COPOLYMERS AND PROCESS FOR PRODUCING SAME

This is a division of application Ser. No. 08/063,745, filed on May 20, 1993.

BACKGROUND OF THE INVENTION

1. Field of the Invention

The present invention relates to a styrenic block copolymer and a process for producing the copolymer. More particularly, it pertains to a styrenic block copolymer which has a high degree of syndiotactic configuration and capabilities of compatibility and adhesiveness; a process for efficiently producing the copolymer; a high-performance resin composition formed by compositing the copolymer and taking full advantage thereof; and a multi-layer material comprising the copolymer or the resin composition.

2. Description of Related Art

Heretofore, styrenic polymers produced by the radical polymerization method have been molded to various shapes by various molding methods and widely used as domestic electrical appliances, office machines, household goods, packaging containers, toys, furnitures, synthetic papers and other industrial materials. Because of their atactic configuration in stereochemical structure, however, such styrenic polymers have suffered the disadvantages of inferior heat resistance and chemical resistance.

In order to solve the above-mentioned disadvantages of the styrenic polymers having atactic configuration, the group of the present inventors succeeded in the development of the styrenic polymers having a high degree of syndiotactic configuration, and further a syndiotactic styrenic polymer formed by copolymerizing styrene monomer with an other monomer (refer to Japanese Patent Application Laid-Open Nos. 104818/1987 and 241009/1988).

The above-developed syndiotactic polymers and copolymers are excellent in heat resistance, chemical resistance and electrical properties, and are expected to find new applications in a variety of fields. However, the above-mentioned syndiotactic polystyrene-based polymer suffers the disadvantage that it is not sufficient in compatibility with an other type of resin and adhesivity to a different kind of material. Accordingly, a composite material of the above-mentioned syndiotactic polystyrene-based polymer and a different material involves the problem with inevitable deterioration of dynamical properties.

under such circumstances, intensive research and investigation were made by the present inventors for the purpose of developing a styrenic polymer of syndiotactic configuration having capabilities of compatibility and adhesiveness; a high performance resin composition formed by compositng said syndiotactic polymer through the full use of the advantages thereof; and a multi-layer material comprising said syndiotactic polymer or said resin composition.

As a result, it has been found by the present inventors that the above-mentioned purpose is attained by the application of a styrenic block copolymer having a reduced viscosity within a prescribed range which comprises the segments composed of a styrenic polymer having a high degree of syndiotactic configuration and the segments composed of a specific styrenic polymer.

The present invention has been accomplished on the basis of the aforestated finding and information.

SUMMARY OF THE INVENTION

In order to attain the above-mentioned purpose, the present invention provides a styrenic block copolymer having a reduced viscosity of 0.01 to 20 dl/g as measured at a concentration of 0.05 g/dl in 1,2,4-trichlorobenzene at 135° C., which comprises at least one (A) structural unit represented by the general formula (I)

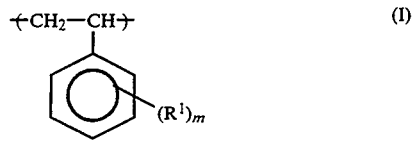

wherein $R^1$ is a hydrogen atom, a halogen atom or a substituent having at least one atom selected from carbon, tin and silicon and may form a condensed ring together with a benzene ring, m is an integer from 1 to 5 and when m is 2 or more, each $R^1$ may be the same or different, the stereoregularity of the main chain of said structural units being of highly syndiotactic; and at least one (B) structural unit represented by the general formula (II)

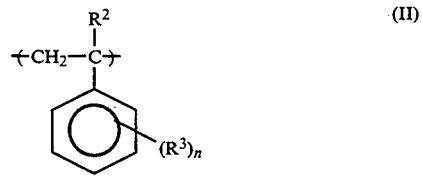

wherein $R^2$ is a hydrogen atom, a halogen atom or a hydrocarbon radical having 1 to 8 carbon atoms, $R^3$ is a heteroatom or a group having a heteroatom each against carbon atom, n is an integer from 1 to 5 and when n is 2 or more, each $R^3$ may be the same or different, said structural unit (B) being different from the structural unit (A) and contained in an amount of $10^{-4}$ to 10 mol %.

The present invention provides a resin composition comprising (Y) said styrenic block copolymer and (Z) at least one member selected from the group consisting of a thermoplastic resin, an inorganic filler and an organic filler.

The present invention further provides a multi-layer material comprising at least one layer of said styrenic block copolymer or said resin composition.

The present invention still further provides a process for producing said styrenic block copolymer which comprises polymerizing at least one styrenic monomer represented by the general formula (III)

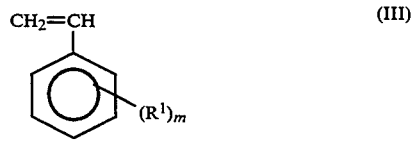

wherein $R^1$ and m are as previously defined, in the presence of a catalyst comprising as principal components (1) a transition metal compound and (b) an aluminoxane; or (2) (a) a transition metal compound and (c) a compound capable of reacting with said transition metal compound to form an ionic complex, to substantially form a polymer; and subsequently reacting said polymer with at least one styrenic monomer which is different from the preceding monomer and represented by the general formula (IV)

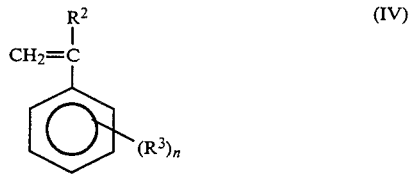

wherein $R^2$, $R^3$ and n are as previously defined to proceed with copolymerization reaction.

DESCRIPTION OF PREFERRED EMBODIMENT

Specific examples of the styrenic monomers represented by the general formula (III) to be used as the starting raw material of the styrenic polymer of the present invention include alkylstyrene such as styrene, p-methylstyrene, o-methylstyrene, m-methylstyrene, 2,4-dimethylstyrene, 2,5-dimethylstyrene, 3,4-dimethylstyrene, 3,5-dimethylstyrene, and p-tert-butylstyrene; halogenated styrene such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; vinylbiphenyls such as 4-vinylbiphenyl, 3-vinylbiphenyl and 2-vinylbiphenyl; vinylphenylnaphthalenes such as 1-(4-vinylphenyl)naphthalene, 2-(4-vinylphenyl)naphthalene, 1-(3-vinylphenyl)naphthalene, 2-(3-vinylphenyl)naphthalene, 1-(2-vinylphenyl)naphthalene and 2-(2-vinylphenyl)naphthalene; vinylphenylanthracenes such as 1-(4-vinylphenyl)anthracene, 2-(4-vinylphenyl)anthracene, 9-(4-vinylphenyl)anthracene, 1-(3-vinylphenyl)anthracene, 2-(3-vinylphenyl)anthracene, 9-(3-vinylphenyl)anthracene, 1-(2-vinylphenyl)anthracene, 2-(2-vinylphenyl)anthracene and 9-(2-vinylphenyl)anthracene, vinylphenylphenanthrene such as 1-(4-vinylphenyl)phenanthrene, 2-(4-vinylphenyl)phenanthrene, 3-(4-vinylphenyl)phenanthrene, 4-(4-vinylphenyl)phenanthrene, 9-(4-vinylphenyl)phenanthrene, 1-(3-vinylphenyl)phenanthrene, 2-(3-vinylphenyl)phenanthrene, 3-(3-vinylphenyl)phenanthrene, 4-(3-vinylphenyl)phenanthrene, 9-(3-vinylphenyl)phenanthrene, 1-(2-vinylphenyl)phenanthrene, 2-(2-vinylphenyl)phenanthrene, 3-(2-vinylphenyl)phenanthrene, 4-(2-vinylphenyl)phenanthrene and 9-(2-vinylphenyl)phenanthrene, vinylphenylpyrenes such as 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene and 2-(2-vinylphenyl)pyrene; vinylterphenyls such as 4-vinyl-p-terphenyl, 4-vinyl-m-terphenyl, 4-vinyl-o-terphenyl, 3-vinyl-p-terphenyl, 3-vinyl-m-terphenyl, 3-vinyl-o-terphenyl, 2-vinyl-p-terphenyl, 2-vinyl-m-terphenyl and 2-vinyl-o-terphenyl; vinylphenylterphenyls such as 4-(4-vinylphenyl)-p-terphenyl; vinylalkylbiphenyls such as 4-vinyl-4'-methylbiphenyl, 4-vinyl-3'-methylbiphenyl, 4-vinyl-2'-methylbiphenyl, 2-methyl-4-vinylbiphenyl and 3-methyl-4-vinylbiphenyl; halogenated vinylbiphenyls such as 4-vinyl-4'-fluorobiphenyl, 4-vinyl-3'-fluorobiphenyl, 4-vinyl-2'-fluorobiphenyl, 4-vinyl-2-fluorobiphenyl, 4-vinyl-3-fluorobiphenyl, 4-vinyl-4'-chlorobiphenyl, 4-vinyl-3'-chlorobiphenyl, 4-vinyl-2'-chlorobiphenyl, 4-vinyl-2-chlorobiphenyl, 4-vinyl-3-chlorobiphenyl, 4-vinyl-4'-bromobiphenyl, 4-vinyl-3'-bromobiphenyl, 4-vinyl-2'-bromobiphenyl, 4-vinyl-2-bromobiphenyl and 4-vinyl-3-bromobiphenyl; trialkylsilylvinylbiphenyls such as 4-vinyl-4'-trimethylsilylbiphenyl; trialkylstannylvinylbiphenyls such as 4-vinyl-4'-trimethylstannylbiphenyl and 4-vinyl-4'-tributylstannylbiphenyl; trialkylsilylmethylvinylbiphenyls such as 4-vinyl-4'-trimethylsilylmethylbiphenyl; trialkylstannylmethylvinylbiphenyls such as 4-vinyl-4'-trimethylstannylmethylbiphenyl and 4-vinyl-4'-tributylstannylmethylbiphenyl; halogen-substituted alkylstyrene such as p-chloroethylstyrene, m-chloroethylstyrene and o-chloroethylstyrene; alkylsilylstyrene such as p-trimethylsilylstyrene, m-trimethylsilylstyrene, o-trimethylsilylstyrene, p-triethylsilylstyrene, m-triethylsilylstyrene, o-triethylsilylstyrene and p-dimethyl-tert-butylsilylstyrene; phenyl group-containing silylstyrene such as p-dimethylphenylsilylstyrene, p-methyldiphenylsilylstyrene and p-triphenylsilylstyrene; halogen-containing silylstyrene such as p-dimethylchlorosilylstyrene, p-methyldichlorosilylstyrene, p-trichlorosilylstyrene, p-dimethylbromosilylstyrene and p-dimethyliodosilylstyrene; silyl group-containing silylstyrene such as p-(p-trimethylsilyl)dimethylsilylstyrene. The styrenic monomer may be used alone or in combination with at least one other styrenic monomer.

In the production of the styrenic polymer of the present invention, there is employed a catalyst comprising as principal components (1) (a) a transition metal compound and (b) an aluminoxane; or (2) (a) a transition metal compound and (c) a compound capable of reacting with a transiton metal compound to form an ionic complex.

Various transition metal compounds are available as the component (a) and exemplified by the compounds represented by the general formula (V)

$$M^1 R^4 \text{---} R^k \qquad (V)$$

wherein $M^1$ is Ti, Zr, Cr, V, Nb, Ta or Hf atom; $R^4$ to $R^k$ are each a hydrogen atom, an oxygen atom, a halogen atom, an alkyl group having 1 to 20 carbon atoms, an alkoxy group having 1 to 20 carbon atoms, an aryl group, an alkylaryl group or an arylalkyl group each having 6 to 20 carbon atoms, an acyloxy group having 1 to 20 carbon atoms, an allyl group, a substituted allyl group, an acetylacetonato group, a substituted acetylacetonato group, a substituent containing silicon atom, a ligand such as a carbonyl, an oxygen molecule, a nitrogen molecule, a Lewis base, an unsaturated chain hydrocarbon or unsaturated cyclic hydrocarbon, cyclopentadienyl group, substituted cyclopentadienyl group, indenyl group, substituted indenyl group tetrahydroindenyl group, substituted tetrahydroindenyl group, fluorenyl group or substituted fluorenyl group; and k is the valency of the metal, that is, usually an integer of 2 to 5; and the ligands in $R^4$ to $R^k$ may form a crosslinked structure among them by covalent bond.

Examples of the substituted cyclopentadienyl group in the above-mentioned formula (V) include methylcyclopentadienyl group; ethylcyclopentadienyl group; isopropylcyclopentadienyl group; 1,2-dimethylcyclopentadienyl group; tetramethylcyclopentadienyl group; 1,3-dimethylcyclopentadienyl group; 1,2,3-trimethylcyclopentadienyl group; 1,2,4-trimethylcyclopentadienyl group; pentamethylcyclopentadienyl group and trimethylsilylcyclopentadienyl group. Specific examples of $R^4$ to $R^k$ include F, Cl, Br and I as halogen atom; methyl, ethyl, n-propyl, isopropyl, n-butyl, octyl and 2-ethylhexyl group as alkyl group having 1 to 20 carbon atoms; methoxy, ethoxy, propoxy, butoxy and phenoxy group as alkoxy group having 1 to 20 carbon atoms; phenyl, tolyl, xylyl and benzyl group as aryl, alkylaryl or arylalkyl group each having 6 to 20 carbon atoms; heptadecylcarbonyloxy group as acyloxy group having 1 to 20 carbon atoms; trimethylsilyl and (trimethylsilyl)methyl group as substituent containing silicon atom; as Lewis base, ethers such as dimethyl ether, diethyl ether and tetrahydrofuran; thioethers such as tetrahydrothiophene; esters such as ethylbenzoate; nitriles such as acetonitrile and benzonitrile; amines such as trimethylamine, triethylamine, tributylamine, N,N-dimethylaniline, pyridine, 2,2'-bipyridine and phenanthroline; phosphine such as triethylphosphine and triphenylphosphine; unsaturated chain hydrocarbon such as ethylene, butandiene, 1-pentene, isoprene, pentadiene, 1-hexene and derivatives thereof; unsaturated cyclic hydrocarbon such as benzene, toluene, xylene, cycloheptatriene, cyclooctadiene, cyclooctatriene, cyclooctatetraene and derivatives thereof. Examples of crosslinkage by covalent bond include methylene, dimethylmethylene, ethylene, dimethylsilylene, dimethylgermylene and dimethylstannylene crosslinkage.

Among the transition metal compounds represented by the general formula (V), specific examples of titanium compounds include tetramethoxytitanium, tetraethoxytitanium, tetra-n-butoxytitanium, tetraisopropoxytitanium, titanium, tetrachloride, titanium trichloride, titanium dichloride, titanium hydride, cyclopetnadienyltrimethyltitanium, dimethoxytitanium dichloride, methoxytitanium trichloride, trimethoxytitanium chloride, cyclopentadienyltriethyltitanium, cyclopetnadienyltripropyltitanum, cyclopentadientyltributyltitanum, methylcyclopentadienyltrimethyltitanium, 1,2-dimethylcyclopentadientyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, pentamethylcyclopentadienylmethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, and the like.

Among the transition metal compounds represented by the general formula (V), specific examples of zirconium compound ($M^1$=Zr) include dicyclopentadienylzirconium dichloride, tetrabutoxyzirconium, zirconium tetrachloride, tetraphenylzirconium, cyclopentadienylzirconium trimethoxide, pentamethylcyclopentadienylzirconium trimethoxide, cyclopentadienyltribenzylzirconium, pentamethylcyclopentadienyltribenzylzirconium, bis(indenyl)zirconium dichloride, dibenzylzirconium dichloride, tetrabenzylzirconium, tributoxyzirconium chloride, triisopropoxyzirconium chloride, pentamethylcyclopentadienyltrimethylzirconium, pentamethylcyclopentadienyltriphenylzirconium, pentamethylcyclopentadienyltrichlorozirconium, cyclopentadienyltrimethylzirconium, cyclopentadienyltriphenylzirconium, cyclopentadienyltrichlorozirconium, cyclopentadienyldimethylmethoxyzirconium, methylcyclopentadienyltrimethylzirconium, methylcyclopentadienyltriphenylzirconium, methylcyclopentadienyltribenzylzirconium, methylcyclopentadienyltrichlorozirconium, methylcyclopentadienyldimethylmethoxyzirconium, dimethylcyclopentadienyltrichlorozirconium, trimethylcyclopentadienyltrichlorozirconium, trimethylsilylcyclopentadienyltrimethylzirconium, tetramethylcyclopentadienyltrichlorozirconium, bis(cyclopentadienyl)dimethylzirconium, bis(cyclopentadienyl)diphenylzirconium, bis(cyclopentadienyl)diethylzirconium, bis(cyclopentadienyl)dibenzylzirconium, bis(cyclopentadienyl)dimethoxyzirconium, bis(cyclopentadienyl)dichlorozirconium, bis(cyclopentadienyl)dihydridezirconium, bis(cyclopentadienyl)monochloromonohydridezirconium, bis(methylcyclopentadienyl)dimethylzirconium, bis(methylcyclopentadienyl)dichlorozirconium, bis(methylcyclopentadienyl)dibenzylzirconium, bis(pentamethylcyclopentadienyl)dimethylzirconium, bis(pentamethylcyclopentadienyl)dichlorozirconium, bis(pentamethylcyclopentadienyl)dibenzylzirconium, bis(pentamethylcyclopentadienyl)chloromethylzirconium, bis(pentamethylcyclopentadienyl)hydridemethylzirconium, (cyclopentadienyl)(pentamethylcyclopentadienyl) dichlorozirconium, ethylenebis(indenyl)dimethylzirconium, ethylenebis(tetrahydroindenyl)dimethylzirconium, ethylenebis(tetrahydroindenyl)dichlorozirconium, dimethylsilylenebis(cyclopentadienyl)dimethylzirconium, dimethylsilylenebis(cyclopentadienyl)dichlorozirconium, isopropyl(cyclopentadienyl)(9-fluorenyl)dimethylzirconium, isopropyl(cyclopentadienyl)(9-fluorenyl)dichlorozirconium, [phenyl(methyl)methylene](9-fluorenyl)(cyclopentadienyl)dimethylzirconium, diphenylmethylene(cyclopentadienyl)(9-fluorenyl)dimethylzirconium, ethylidene(9-fluorenyl)(cyclopentadienyl)dimethylzirconium, cyclohexyl(9-fluorenyl)(cyclopentadienyl)dimethylzirconium, cyclobenzyl(9-fluorenyl)(cyclopentadienyl)dimethylzirconium, cyclobutyl(9-fluorenyl)(cyclopentadienyl)dimethylzirconium, dimethylsilylene(9-fluorenyl)(cyclopentadienyl)dimethylzirconium, dimethylsilylenebis(2,3,5-trimethylcyclopentadienyl)dichlorozirconium, dimethylsilylenebis(2,3,5-trimethylcyclopentadienyl)dimethylzirconium.

Specific examples of hafnium compounds include cyclopentadienylhafnium trimethoxide, pentamethylcyclopentadienylhafnium trimethoxide, cyclopentadienyltribenzylhafnium, pentamethylcyclopentadienyltribenzylhafnium, bisindenylhafnium dichloride, dibenzylhafnium dichloride, tetrabenzylhafnium, tributoxyhafnium chloride, triisopropoxyhafnium chloride, hafnium tetrachloride, dicyclopentadienylhafnium dichloride and tetraethoxyhafnium.

Specific examples vanadium compounds include vanadium trichloride, vanadyl trichloride, vanadium triacetylacetonato, vanadium tetrachloride, vanadium tributoxide, vanadyl dichloride, vanadyl bisacetylacetonato, vanadyl triacetylacetonato, dibenzenevanadium, dicyclopentadienylvanadium, dicyclopentadienylvanadium dichloride, cyclopentadienylvanadium dichloride and cyclopentadienylmethylvanadium.

Specific examples of niobium compounds include niobium pentachloride, tetrachloromethylniobium, dichlorotrimethylniobium, dicyclopentadienylniobium dichloride, dicyclopentadienylniobium trihydride, and pentabutoxyniobium.

Specific examples of tantalum compounds include tantalum pentachloride, dichlorortrimethyltantalum, dicyclopentadienyltantalum trihydride and pentabutoxytantalum.

Specific examples of chrominum compounds include chrominum trichloride, tetrabutoxychronium, tetramethylchrominum, dicyclopentadienylchloromium and dibenzenechrominum.

As the other transition metal compounds there may be employed the above-mentioned transition compounds each supported on a carrier such as a magnesium compound or a silicon compound and those each modified with an electron donative compound.

Among the above-mentioned transition metal compounds are particularly desirable the titanium compounds and the zirconium compounds.

As a component of the catalyst (1) in the present invention, an aluminoxnae (b) is employed together with the transition metal compound (a). The aluminoxane is obtained by bringing an organoaluminum compound into contact with a condensation agent, and includes a chain aluminoxane represented by the general formula (VI)

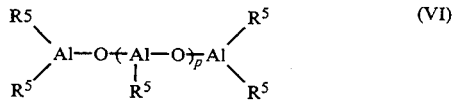
(VI)

wherein $R^5$ is alkyl group having 1 to 20 carbon atoms, is preferably a methyl group and p is a number from 0 to 50, preferably 5 to 30; and a cyclic aluminoxane represented by the general formula (VII)

(VII)

wherein $R^5$ is as previously defined and q is a number from 2 to 50, preferably 5 to 30.

The organoaluminum compound is exemplified by a trialkylaluminum such as trimethylaluminum, triethylaluminum and triisobutylaluminum, of which is preferable trimethylaluminum.

The condensation agent is typified by water and exemplified by an arbitrary substance which undergoes condensation reaction with a trialkylaluminum such as copper sulphate pentahydrate, water adosorbed in an inorganic or organic substance and so forth.

In general, the contact product of an organoaluminum compounds such as trialkylaluminum and water contains the above-mentioned chain alkylaluminoxane and cyclic alkylaluminoxane together with unreacted trialkylaluminum, various mixture of condensates and further the molecules resulting from association in an intricate manner thereof. Accordingly, the resultant contact product varies widely depending upon the conditions of contact of trialkylaluminum with water as the condensation agent.

The reaction of the alkylaluminum compound and water is not specifically limited in the above case and may be effected according to the publicly known methods, which are exemplified by (1) a method in which an organoaluminum compound is dissolved in an organic solvent an then brought into contact with water, (2) a method in which an organoaluminum compound is first added to the reaction system at the time of polymerization and thereafter water is added thereto, and (3) a method in which an organoaluminum compound is reacted with the water of crystallization contained in metal salts and the like, or the water adsorbed in inorganic or organic materials. The above-mentioned water may contain up to about 20% of ammonia, amine such as ethylamine, sulfur compound such as hydrogen sulfide, phosphorus compound such as phosphite, or the like. The above-mentioned reaction proceeds even in the absence of a solvent but is preferably carried out in a solvent. Examples of the suitable solvent to be used here include aliphatic hydrocarbons such as hexane, heptane and decane, aromatic hydrocarbons such as benzene, toluene and xylene, and the like. The aluminoxane (e.g. an alkylaluminoxane) is preferably obtained by a method wherein the solid residue produced after contact reaction in the case of a water-containing compound being used is removed by means of filtration and the filtrate is heat treated under atmospheric or reduced pressure at 30° to 200° C., preferably 40° to 150° C. for 20 minutes to 8 hours, preferably 30 minutes to 5 hours while distilling away the solvent used.

The temperature in the aforementioned heat treatment may be pertiently determined according to the various conditions, but should be usually within the above-described ranage. The temperature lower than 30° C. fails to bring about the prescribed effect, whereas that exceeding 200° C. causes thermal decomposition of aluminoxane itself, each resulting in unfavorable consequence.

The reaction product is obtained in the form of colorless solid or solution depending upon the heat treatment conditions, and can be used as the catalyst solution by dissolving in or diluting with a hydrocarbon solvent according to the demand.

Suitable examples of the aluminoxane, that is, the contact product of organoaluminum compound and a condensation agent which is used as the component of the catalyst, especially an alkylaluminoxane are those in which the area of the high magnetic field component in the methyl proton signal region due to the aluminummethyl group (Al—CH$_3$) bond as observed by the proton nuclear magnetic resonance method is not more than 50% of the total signal area. That is, in a proton nuclear magnetic resonance ($^1$H-NMR) spectral analysis of the alkylaluminoxane in toluene solvent at room temperature, the methyl proton signal due to Al—CH$_3$ is observed in the region of 1.0 to −0.5 ppm (tetramethylsilane (TMS) standard). Since the proton siganl of TMS (0 ppm) is in the region of the methyl proton siganl due to Al—CH$_3$, the methyl proton signal due to Al—CH$_3$ is measured with 2.35 ppm methyl proton signal of toluene in TMS standard. The methyl proton signal due to Al—CH$_3$ is divided into two comonents: the high magnetic field component in the −0.1 to −0.5 ppm region and the other magnetic field component in the 1.0 to −0.1 ppm region. In alkylaluminoxane preferably used as component (B) of the catalyst in the present invention, the area of the high magnetic field component is not more than 50%, preferably 45 to 5% of the total signal area in the 1.0 to −0.5 ppm region.

As a component of the catalyst (2) in the present invention, there is employed (c) a compound capable of reacting with a transition metal compound to form an ionic complex together with the (a) transition metal compound. The (c) compound is not specifically limited, but there is preferably used a compound comprising a cation and an anion in which a plurality of radicals are bonded to an element, specifically a compound comprising a cation having a element selected from the groups of IIIB, VB, VIB, VIIB, VIIIB, IA, IB, IIA, IIB, IVA and VIIA of the Periodic Tabel and an anion in which a plurality of radicals are bonded to an element selected from the groups of VB, VIB, VIIB, VIII, IB, IIB, IIIA, IVA and VA of the Periodic Table, especially a coordination complex compound comprising the cation and the anion in which a plurality of radicals are bonded to the element. The (c) compound is exemplified by the compound represented by the general formula (VIII) or (IX).

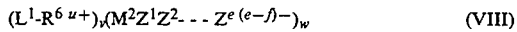

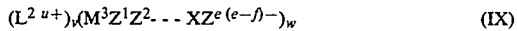

wherein $L^2$ is $M^4$, $R^7R^8M^5$ or $R^9{}_3C$ or $R^{10}M^5$; $L^1$ is a Lewis base; $M^2$ and $M^3$ are each an element selected from Groups VB, VIB, VIIB, VIII, IB, IIB, IIIA, IVA and VA of the Periodic Table; $M^4$ and $M^5$ are each an element selected from Groups IIIB, IV, V, VIB, VIIB, VIII, I, IB, IIA, IIB and VIIA of the Periodic Table; $Z^1$ to $Z^e$ are each a hydrogen atom, a dialkylamino group, an alkoxy group having 1 to 20 carbon atoms, an aryloxy group having 6 to 20 carbon atoms, an alkyl group having 1 to 20 carbon atoms, an aryl group having 6 to 20 carbon atoms, an alkylaryl group, an arylalkyl group, a halogen-substituted hydrocarbon radical having 1 to 20 carbon atoms, an acyloxy group having 1 to 20 carbon atoms, an organometalloid group or a halogen atom and at least two of them may combine with each other to form a ring; $R^6$ is a hydrogen atom, an alkyl group having 1 to 20 carbon atoms, an aryl group having 6 to 20 carbon atoms, an alkylaryl group or an arylalkyl group; $R^7$ and $R^8$ are each a cyclopentadienyl group, a substituted cyclopentadienyl group, an indenyl group or a fluorenyl group; $R^9$ is an alkyl group having 1 to 20 carbon atoms, an aryl group, an alkylaryl group or an arylalkyl group; $R^{10}$ is a macrocyclic ligand such as tetraphenylporphyrin and phthalocyanine; f is the valency of each of $M^2$ and $M^3$, indicating an integer of 1 to 7; e is an integer of 2 to 8; u is the ion valency of each of $[L^1\text{-}R^6]$ and $[L^2]$, indicating an integer of 1 to 7; v is an integer of 1 or more; and $w=(v\times u)/(e-f)$.

Specific examples of the Lewis base represented by $L^1$ include amines such as ammonia, methylamine, aniline, dimethylamine, diethylamine, N-methylaniline, diphenylamine, trimethylamine, triethylamine, tri-n-butylamine, N,N-dimethylaniline, methyldiphenylamine, pyridine, 2,2-bipyridine, p-bromo-N,N'-dimethylaniline, p-nitro-N,N-dimethylaniline and phenanthroline; phosphines such as triethylphosphine, triphenylphosphine and diphenylphosphine; ethers such as dimethylether, diethyl ether, tetrahydrofuran dioxane; thioethers such as diethyl thioether and tetrahydrothiophene; esters such as ethylbenzoate; and nitriles such as acetonitrile and benzonitrile.

Specific exmamples of $M^2$ and $M^3$ include B, Al, Si, P, As, Sb, etc.; those of $M^4$ include Li, Na, Ag, Cu, Br, I, $I_3$, etc.; and those of $M^5$ include Mn, Fe, Co, Ni, Zn, etc. Specific examples of $Z^1$ to $Z^e$ include dialkylamino group such as dimethylamino and diehtylamino, alkoxy group having 1 to 20 carbon atoms such as methoxy, ethoxy and n-butoxy; aryloxy group having 6 to 20 carbon atoms such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atos, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl, 2,3-dimethylphenyl and 1,2-dimethylphenyl; halogen-substituted hydrocarbon radical having 1 to 20 carbon atoms include p-fluorophenyl, 3,5-difluorophenyl, pentachlorophenyl, 3,4,5-trifluorophenyl, pentafluorophenyl and 3,5-di(trifluoromethyl)phenyl; halogen atoms such as F, Cl, Br and I and organometalloid group such as pentamethylantimony group, trimethylsilyl group, trimethylgermyl group, diphenylarsine group, dicyclohexylanitimony group and diphenylboron group. Specific examples of $R^6$ and $R^9$ are as previously enumerated. Specific examples of substitued cyclopentadienyl gorup in $R^7$ and $R^8$ include alkyl group-substituted cyclopentadienyl group such as methylcyclopentadienyl, butylcyclopentadienyl and pentamethylcyclopentadienyl, where the alkyl group has usually 1 to 6 carbon atoms and the number of the substituted alkyl groups are selected from the integers of 1 to 4.

The compound represented by the general formula (VIII) or (IX) is preferably the compound in which $M^2$ or $M^3$ is boron, and enumerated, as preferably usable one of the general formula (VIII) by triethylammonium tetraphenylborate, tri(n-butyl)ammonium tetraphenylborate, trimethylammonium tetraphenylborate, tetraethylammonium tetraphenylborate, methyltri(n-butyl)ammonium tetraphenylbroate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzylmethylsulfonium tetraphenylborate, triehtylammonium tetra(pentafluorophenyl)borate, triphenylammonium tetra(pentafluorophenyl)borate, tetrabutylammonium tetra(pentafluorophenyl)borate, tetraethylammonium tetra(pentafluorophenyl)borate, methyltri(n-butyl)ammonium tetra(pentafluorophenyl)borate, benzyltri(n-butyl)ammonium tetra(pentafluorophenyl)borate, methyldiphenylammonium tetra(pentafluorophenyl)borate, methyltriphenylammonium tetra(pentafluorophenyl)borate, dimethyldiphenylammonium tetra(pentafluorophenyl)borate, anilinium tetra(pentafluorophenyl)borate, methylanilinium tetra(pentafluorophenyl)borate, dimethylanilinium tetra(pentafluorophenyl)borate, trimethylanilinium tetra(pentafluorophenyl)borate, dimethyl(m-nitroanilinium) tetra(pentafluorophenyl)borate, dimethyl(p-bromoanilinium) tetra(pentafluorophenyl)borate, pyridinium tetra(pentafluorophenyl)borate, p-cyanopyridinium tetra(pentafluorophenyl)borate, N-methylpyridinium tetra(pentafluorophenyl)borate, N- benzylpyridinium tetra(pentafluorophenyl)borate, o-cyano-N-methylpyridinium tetra(pentafluorophenyl)borate, p-cyano-N-methylpyridinium tetra(pentafluorophenyl)borate, p-cyano-N-benzylpyridinium tetra(pentafluorophenyl)borate, trimethylsulfonium tetra(pentafluorophenyl)borate, benzyldimethylsulfonium tetra(pentafluorophenyl)borate, teraphenylphosphonium tetra(pentafluorophenyl)borate, dimethylanilinium tetra(3,5-di-trifluoromethylphenyl)borate and triethylammonium hexafluoroarsenate.

Examples of the compound of the general formula (IX) include ferrocenium tetraphenylborate, silver tetraphenylborate, trityl tetraphenylborate, (tetraphenylporphyrin manganate) tetraphenylborate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetra(pentafluorophenyl)borate, trityl tetra(pentafluorophenyl)borate, lithium tetra(pentafluorophenyl)borate, sodium tetra(pentafluorophenyl)borate, (tetraphenylporphyrin manganate) tetra(pentafluorophenyl)borate, (tetraphenylporpyrinium chloride) tetra(pentafluorophenyl)borate, (tetraphenylporphyrin zincate) tetra(pentafluorophenyl)borate, silver tetrafluoroborate, silver hexafluoroarsenate and silver hexafluoroantimonate.

As the compound other than that represented by the general formula (VIII) or (IX), there are usable, for example, tri(pentafluorophenyl)boron, tri[3,5-di(trifluoromethyl)phenyl]boron and triphenylboron.

In the present invention, an organometallic compound as component (d) may be employed, as desired, in combination with the above-described catalyst (1) or (2), and is represented by the general formula (X)

$$M^6(R^{11})_r \qquad (X)$$

where $R^{11}$ is an alkyl group having 1 to 20 carbon atoms, an alkenyl group having 2 to 20 carbon atoms, a cycloalkyl group having 3 to 20 carbon atoms, an aryl group having 6 to 20 carbon atoms or aralkyl group having 7 to 20 carbon atoms, and is specifically exemplified by methyl group, ethyl group, n-propyl group, isopropyl group, n-butyl group, isobutyl group, hexyl group, 2-ethylhexyl group and phenyl group; $M^6$ is lithium, sodium, potassium, magnesium, zinc, cadminum, aluminum, boron, gallium, silicon or tin; and r is the valency of $M^6$.

Various compounds of the general formula (X) are available and specifically exemplified by an alkyllithium compound such as methyllithium, ethyllithium, propyllithium and butyllithium, an alkylmagnesium compound such as diethylmagnesium, ethylbutylmagensium and di-n-butylmagnesium; a dialkylzinc compound such as dimethylzinc, diethylzinc, dipropylzinc and dibutylzinc; an alkylgallium compound such as trimethylgallium, triethylgallium and tripropylgallium; an alkylboron compound such as triethylboron, tripropylboron and tributylboron; and an alkyltin compound such as tetraethyltin, tetrapropyltin and tetraphenyltin.

There are available a variety of compounds of the general formula (X) wherein $M^6$ is aluminum, which are specifically exemplified by trimethylaluminum, triethylaluminum, triisopropylaluminum, triisobutylaluminum, tri-n-hexylaluminum and trioctylaluminum.

The proportion of each component of the catalyst to be used in the present invention is not specifically limited, but the molar ratio of the component (a) to the component (b) is 1:20 to 1:10000, preferably 1:100 to 1:2000.

On the other hand, in the catalyst (2), the molar ratio of the component (a) to the component (c) is desirably 1:0.01 to 1:100, more desirably 1:1 to 1:10. In this case, the components (a) and (c) may be previously brought into contact with each other, followed by separation and washing of the resultant contact product for use, or may be brought into contact in the reacion system. The amount of the component (d) to be used as desired in the catalyst (1) or (2) is selected usually in the range of 0 to 100 mols per one (1) mol of the component (a). The use of the component (d) can improve the polymerization activity, but an excessive usage does not mainfest the effect corresponding thereto. The component (d) may be used by bringing it into contact with the component (a) or (c) or the contact product between the components (a) and (c) in advance or by the successive addition to the polymerization system.

The proportion of the styrenic monomer to the catalyst to be used is not particularly limited, but is selected usually in the range of 10 to $10^9$ preferably $10^2$ to $10^7$ in terms of the molar ratio of the styrenic polymer to the transition metal compound.

In the production of the styrenic block copolymer of the present invention, the above-described styrenic monomer represented by the general formula (II) is polymerized in the presence of the above-described catalyst as the first step, in which the polymerization method, polymerization conditions including polymerization temperature and polymerization time, and the solvent to be used may be suitably selected. The polymerization is carried out at a temperature in the range of usually 0° to 120° C., preferable 10° to 80° C. for 1 second to 10 hours, preferably 1 minute to 6 hours. As the polymerization method, any of slurry, solution, bulk and gas-phase polymerization is available with continuous or discontinuous polymerization. The usable solvents in solution polymerization are exemplified by aromatic hydrocarbons such as benzene, toluene, xylene and ethylbenzene and aliphatic hydrocarbons such as cyclopentane, hexane, heptane, and octane, alone or as a combination of at least two of them. In this case, the monomer to solvent ratio by volume may be arbitrarily selected.

Subsequently to the first step in which the polymer is substantially produced as a block precursor, the polymer is incorporated with a styrenic monomer having a heteroatom (against carbon atom) which is represented by the general formula (IV) and different from the styrenic monomer used for producing the aforesaid block precursor to successively proceed with polymerization reaction. The preferable styrenic monomer having a heteroatom is that having at least one atom selected from oxygen, nitrogen, sulfur, phosphorus and bromine or a substituent having at least one of said atoms and is exemplified by alkoxystyrenes and hydroxystyrenes such as o-methoxytoluene, p-methoxytoluene, m-methoxytoluene, o-ethoxytoluene, p-ethoxytoluene, m-ethoxytoluene, 4-methoxy-3-methylstyrene, p-proproxystyrene, p-phoxystyrene, p-hydroxystyrene and p-acetoxystyrene; carboxystyrene such as p-vinyl benzoate, methyl-p-vinyl benzoate, glycidyl-p-vinyl benzoate, phenyl-p-vinyl benzoate, 3-vinyl salicylate, 4-vinyl salicylate, methyl-4-viyl salicylate, p-formylstyrene, p-acetylstyrene, o-acetylstyrene, p-vinylbenzophenone, p-vinylbenzamide and N,N-dimethyl-p-vinylbenzamide; nitrostyrenes and cyanostyrenes such as o-nitrostyrene, m-nitrostyrene, p-nitrostyrene, 2-nitro-4-isopropylstyrene, 2,4,6-trinitrostyrene, p-(2-nitroethyl)styrene, o-cyanostyrene, m-cyanostyrene and p-cyanostyrene; o-aminostyrene, m-aminostyrene, p-aminostyrene, 3,4-diaminostyrene, m-N,N-dimethylaminostyrene, p-N,N-dimethylaminostyrene, p-N,N-diethylaminostyrene, p-N,-laurylaminostyrene, p-N-stearylaminostyrene, 4-amino-3-nitrostyrene, p-vinylbenzyldimethylamine, p-vinylbenzyldiethylamine, p-vinylbenzyldi-n-propylamine, p-vinylbenzyldi-n-butylamine, p-vinylbenzyl-n-amylamine, p-vinylbenzyldiallylamine, N-(p-vinylbenzyl)pyrrolidine, N-(p-vinylbenzyl)piperidine, N-(p-vinylbenzyl)morpholine, and p-(2-aminoethyl)styrene; and sulfur-containing styrene derivative such as p-vinylbenzenesulfonic acid, sodium p-vinylbenezenesulfonate, potassium p-vinylbenzenesulfonate, ammonium p-vinylbenzenesulfonate, ethyl p-vinylbenzenesulfonate, methyl p-vinylbenzenesulfonate, n-propyl p-vinylbenzenesulfonate, isobutyl p-vinylbenzenesulfonate, sec-butyl p-vinylbenzenesulfonate, o-vinylbenezenesulfonyl fluoride, p-vinylbenzenesulfonyl fluoride, p-vinylbenzenesulfinic acid, sodium p-vinylbenzenesulfinate, potassium p-vinylbenzenesulfinate, p-vinylbenezenesulfonyl chloride and p-methylfulfonylstyrene.

Examples of the usable styrene derivatives other than the above include a styrene derivative having a cyclic ether as a substituent and a styrene derivative having, as a substituent, bromostyrene, dibromostyrene or an isocyanate.

Among the styrenic monomers having a heteroatom, that having a bromine atom, an amino group, a hydroxyl group, an ether group, an isocyanate group, a carboxylic acid group or a carboxylic acid ester gorup is preferably used in the case where the styrenic block copolymer is used for forming a resin composition or a multi-layer material. The styrenic monomer having a heteroatom may be employed alone or in combination with at least one of others.

The polymerization temperature in the copolymerization reaction is not specifically limited, but is selected in the range of usually $-100°$ to $120°$ C., preferably $-10°$ to $80°$ C. The polymerization time varies depending on the composition of the copolymer and is selected in the range of usually 5 seconds to 24 hours, preferably 100 seconds to 10 hours.

The modification of the composition of the copolymer to be produced may be carried out by properly selecting the charge ratio of the styrenic monomer represented by the general formula (III) to the styrenic monomer having a heteroatom and represented by the general formula (IV), and polymerization temperature and time in each stage of polymerization reaction.

The styrenic block copolymer obtained in such a way has a high degree of syndiotactic configuration in the stereoregularity of the structural unit represented by the general formula (I). Here, the syndiotactic configuration syndiotactic configuration means that its stereochemical structure is of syndiotactic configuration, that is, the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic copolymers having such syndiotactic configuration as mentioned in the present invention usually means a polymer having such syndiotacticity that the proportion of racemic diad is at least 75%, preferably at least 85%, or the proportion of racemic pentad is at least 30%, preferably at least 50% in the main chain structure of styrenic repeating units. However, the degree of syndiotactic configuration varies' to some extent depending on the types of substituents and the like.

It is necessary that the styrenic block copolymer contains the structural unit represented by the general formula (II) in an amount of $10^{-4}$ to 10 mol %, preferably $10^{-3}$ to 5 mol %. A content thereof less than $10^{-4}$ mol % results in failure to sufficiently manifest compatibility and adhesivity, whereas that exceeding 10 mol % is unfavorable, since it tends to lower the crystallinity of the copolymer and produce a polymer other than the styrenic block copolymer of the present invention.

It is necessary that the styrenic block copolymer of the present invention obtained in the above-mentioned manner has a reduced viscosity of 0.01 to 20, as measured at a concentration of 0.05 g/dl in 1,2,4-trichlorobenzene at 135° C. A reduced viscosity thereof less than 0.01 dl/g results in failure to sufficiently manifest the physical properties as the polymer, whereas the reduced viscosity exceeding 20 dl/g causes deterioration of moldability and workability.

The resin composition of the present invention comprises the styrenic block copolymer as the component (Y) and, as the component (Z), at least one member selected from the group consisting of a thermoplastic resin, an inorganic filler and an organic filler.

Various types of termoplastic resins are available and exemplified by polyolefin resin, polystyrene resin, condensation high polymer, addition polymerization high polymer, etc. Specific examples of polyolefin resins include high density polyethylene, low density polyethylene, poly-3-methylbutene-1, poly-4-methyl-pentene-1, linear low density polyethylene obtained by the use of such a comonomer as butene-1; hexene-1; octene-1; 4-methylpentene-1; 3-methylisobutene-1 or the like, and chemically modified products thereof, ethylene/vinyl acetate copolymer, saponified product thereof, ethylene/acrylic acid copolymer, ethylene/acrylic ester copolymer, ethylenic ionomer, polypropylene, chemically modified products thereof, etc. Specific examples of polystyrene resin include general-purpose polystyrene, isotactic polystyrene, syndiotactic polystyrene other than the above-described one, high impact polystyrene (rubber modified), etc. Specific examples of the condensation high polymer include polyacetal resin, polycarbonate resin, polyamide resin such as nylon 6 and nylon 6-6, polyester resin such as polyethylene terephthalate and polybutylene terephthalate, polyphenylene oxide resin, polyimide resin, polysulfone resin, polyethersulfone resin, polyphenylene sulfide resin, etc. Specific examples of addition polymer include a polymer obtained from a polar vinyl monomer, a polymer obtained from a diene monomer, etc. enumerated by poly(methyl methacrylate), polyarylonitrile, acrylonitrile/butadine copolymer, acrylonitrile/- butadiene/styrene copolymer, a polymer having hydrogenated diene chains, thermoplastic elastomer, etc.

Among the above-exemplified thermoplastic resins, examples of the preferable thermoplastic resin include that having a substituent or a terminal functional group each being reactive with the block portion of the (Y) styrenic block copolymer; that having a structure similar to that of the block portion; and that having an epoxy group or a carboxylic acid group as the block chain suitable for providing adhesiveness to a metal, etc. The thermoplastic resin may be used alone or in combination with at least one different thermoplastic resin.

The types of the inorganic filler and the organic filler to be used as the component (B) in the present invention are not specifically restricted, but may be the known types having various forms such as granule, plate, lamella, fiber and whisker.

As the inorganic filler, there are usable inorganic-matter type filler, metallic filler, ceramics filler, etc. Examples of the inorganic-matter type filler include an oxide such as silica, diatomaceous earth, barium ferrite, berylium oxide, pumice and pumice balloon; a hydroxide such as aluminum hydroxide, magnesium hydroxide and basic magnesium carbonate; a carbonate such as calcium carbonate, magnesium carbonate, dolomite and dosonite; a sulfate or sulfite such as calcium sulfate, barium sulfate, ammonium sulfate and calcium sulfite; a silicate such as talc, clay, mica, asbestos, glass fiber, glass balloon, glass bead, calcium silicate, montmorillonite and bentonire; a carbon such as carbon black, graphite, carbon fiber and hollow carbon sphere; molybdenum sulfide; boron fiber; zinc borate; barium metaborate; calcium borate; and sodium borate.

Examples of the metallic filler include a metal element, metal compound, alloy, etc. each in the form of powder or granule, specifically exemplified by a metal element such as zinc, copper, iron, lead, aluminum, nickel, chromium, titanium, manganese, tin, platinum, tungsten, gold, magnesium, cobalt and strontium; the oxide thereof; an alloy such as stainless steel, solder and brass; metallic fiber such as aluminum fiber, stainless-steel fiber, copper fiber, bronze fiber, nickel fiber, potassium titanate fiber, other simple metal fiber and synthetic fiber and corresponding metal whiskers.

Examples of the ceramics filler include silicon carbide, silicon nitride, zirconia, aluminum nitride, titanium carbide each in the form of powder, granule, fiber of whisker.

Examples of the organic filler include shell fiber such as husk, wooden powder, cotton, jute, paper piece, cellophane piece, aromatic polyamide fiber, polyimide fiber, cellulose fiber, nylon fiber, polyester fiber, polypropylene fiber and thermosetting resin powder. The above-mentioned filler may be used alone or in combination with at least one of other fillers.

The above-mentioned resin composition according to the present invention may be subjected as desired to the addition of at least one additive enumerated by heat resistant stabilizer, weatherproof stabilizer, antistatic agent, sliding agent, anti-blocking agent, anti-fogging agent, lubricant, foaming agent, dye, pigment, natural oil, synthetic oil, wax, etc. in a pertinent compounding ratio. Specific examples of the stabilizers to be optionally compounded include phenolic antioxidant such as tetrakis [methylene-3(3,5-di-tert-butyl-4-hydroxyphenyl)propionate] methane, β-(3,5-di-tert-butyl-4-hydroxyphenyl)propionic alkylester and 2,2′-oxamindebis-[ethyl-3(3,5-di-tert-butyl-4-hydroxyphenyl)]propionate; metallic salt of fatty acid such as zinc stearate, calcium stearate and calcium 12-hydroxystearate; polyhydric alcohol-fatty acid ester such as glycerol monostearate, glycerol monolaurate, glycerol distearate, pentaerythritol monostearate, pentaerythritol distearate and pentaerythritol tristearate. Each of the aforementioned additives may be compounded alone or in combination with other additive/s. which combination being exemplified as the preferable one by tetrakis[methylene-3(3,5-di-tert-butyl-4-hydroxyphenyl)propionate]methane, zinc stearate and glycerol monostearate.

The compounding ratio of the (Y) styrenic block copolymer to the (Z) thermoplastic resin, when used, varies depending on the situation and can not be unequivocally determined. It is determined however, usually in the following manner.

In the case of a syndiotactic polystyrene (SPS) being used as the thermoplastic resin, the purpose is to supplement the insufficiency of the adhesiveness and compatibility, that is, the disadvantage of SPS, and thus, a large amount of the block chain component is not required in the composition. Accordingly, in the composition with the styrenic block copolymer with less amount of the block chain component, the comounding ratio of SPS should be relatively low, while in the composition with the copolymer with much amount of the block chain component, the compounding ratio of SPS should be relatively high.

In the case of the thermoplastic resin being other than SPS, it is preferable that the block chain content in the copolymer be relatively low in order to make full use of SPS characteristics. In the case where SPS and other thermoplastic resin are added to the copolymer, the copolymer functions as the compatibilizing agent between the SPS and the thermoplastic resin, and thus, the optimum range of the block chain content may be determined by the combination with the resin.

Taking the above-mentioned factors into consideration the compounding ratio by weight of the styrenic block copolymer as the component (Y) to the thermoplastic resin when used as the component (Z) in the resin composition is selected in the range of usually 0.5:99.5 to 99.5:0.5, preferably 1:95 to 99:5.

The compounding ratio by weight of the styrenic block copolymer as the component (Y) to the inorganic filler or the organic filler, when compounded in the composition as the component (Z) is desirably 20:80 to 95:5, more desirably 40:60 to 90:10.

The compounding ratio by weight of the resin mixture of the styrenic block copolymer as the component (Y) with the thermoplastic resin as the component (Z) to the inorganic filler or the organic filler, when compounded in the resin composition, is desirably 20:80 to 95:5, more desirably 40:60 to 90:10.

The resin composition of the present invention can be prepared by any of various procedures without specific limitation, preferably by the melt kneading that is conventionally used in a thermoplastic resin composition by the use of a known means such as Banbury mixer, single-screw or twin-screw extruder, kneader, continuous mixer or mixing roll, or by means of solution blending using a suitable solvent.

The multi-layer material according to the present invention comprises at least one layer consisting of the resin composition or the aforestated styrenic block copolymer, and the material of the other layer is not specifically limited, but is exemplified by a thermoplastic resin, a thermosetting resin, a metal and other material.

Examples of the thermoplastic resin include those as exemplified in the description of the component (Z). The thermoserring resin is exemplified by phenolic resin, epoxy resin, unsaturated polyester resin and fiber-reinforced product therefrom.

Examples of the metallic materials include aluminum, copper, iron, nickel, tin, chromium, silver, stainless steel, suralumin, and brass. Examples of the other materials include ceramics, glass, paper, fiber, fabric and wood. Any of the above-exemplified material may be used alone or in combination with at least one other material according to the purpose of use.

Each layer or part constituting the multi-layer material of the present invention may be in a variety of shapes and states including, for example, film, sheet, fiber (woven fabric or nonwoven fabric), moldings, sinter, single crystal, foam, porous material, etc.

The method of multi-layering the materials is not specifically limited, but may be in accordance with any of the various conventional methods, exemplified by coextrusion, lamination pressing, etc. for the material of the different layer being a thermoplastic resin. When the material of the different layer is a metal, particularly the metal to be laminated is comparetively thin, lamination, metal vapor deposition, electrostatic coating and the like are available. When a material is laminated onto a molding or a thick material, there is available a method in which the molding or the thick material is covered with a film or sheet by heat fusion, impregnation or coating.

The multi-layer material of the present invention may be in a variety of shapes and states and comprises the layers of film, sheet, fiber fabric, moldings, sinter, single crystal, foam or porous material, the surface of which contains the styrenic copolymer, said layers being laminated or covered by impregnation or coating, etc. or comprises the complex material thereof.

The above-mentioned multi-layer materials are widely utilized in a variety of fields including automobile parts, electrical and electronic parts as well as film, sheet (especially stampable sheet), container and packaging materials.

In summary, the styrenic block copolymer according to the present invention comprises highly syndiotactic styrenic-polymer segments and heteroatom-containing styrenic polymer segments, exhibits excellent capabilities of compatibility and adhesiveness, and is favorably employed as raw materials for composite materials, multi-layer material, etc.

In addition, the resin composition comprising the highly syndiotactic styrenic block copolymer, a thermoplastic resin and/or an inorganic filler and an organic filler has excellent performance, and the multi-layer material comprising the styrenic block cooplymer is excellent in adhesiveness.

In the following, the present invention will be described in more detail with reference to examples and comparative examples, which however, shall not be construed to limit the invention thereto.

EXAMPLE 1

(1) Preparation of tri(n-butyl)ammonium tetra(pentafluorophenyl)borate

Pentafluorophenyllithium which was prepared form 152 mmol of bromopentafluorobenzene and 152 mmol of butyllithium was reacted with 45 mmol of trichlororboron in hexane to produce tri(pentafluorophenyl)boron as white solid, 41 mmol of which was reacted with 41 mmol of pentafluorophenyllithium to produce lithium tetra(pentafluorophenyl)boron as white solid and isolate the same.

Then, 16 mmol of lithium tetra(pentafluorophenyl)boron was reacted with 16 mmol of tir-n-butylamine hydrochloride in water to prodece 12.8 mmol of tri(n-butyl)ammonium tetra(pentafluorophenyl)borate as white solid.

(2) Production of styrenic block copolymer

In a one (1) liter autoclave equipped with a stirrer were placed, in an nitrogen atmosphere, 100 ml of toluene, 200 ml of styrene, one (1) mmol of triisobutylaluminum (TIBA) and 10 $\mu$mol of tri(n-butyl)ammonium tetra(pentafluorophenyl)borate as prepared in the above item (1), and the mixture was heated to 70° C.

Into the autoclave was further introduced 5 $\mu$mol of pentamethylcyclopentadienyltrimethyltitanium (Cp*TiMe$_3$) to carry out copolymerization for 40 min. Thereafter 10 mmol of p-aminostyrene was added to the reaction system to further proceed with reaction for 10 min.

The polymer thus obtained was cleaned with methanol and dried to afford 142 g of white solid, which was subjected to Soxhlet extraction by the use of MEK as the extraction solvent to remove amorphous portion.

The copolymer was obtained as the MEK insoluble portion in an amount of 96% by weight and had an aminostyrene unit content of 0.2 mol % as the result of elemental analysis and a reduced viscosity of 1.62 dl/g as measured at a concentration of 0.05 g/dl in 1,2,4-trichlorobenzene at 135° C.

The melting point (Tm) of the copolymer was measured by DSC (differential scanning calorimetry) under the conditions of (1) first heating (from 30° C. to 300° C. at 20° C./min.); (2) maintained at 300° C. for 5 min.; (3) first cooling (from 300° C. to 30° C. at 7° C./min); (4) maintained at 30° C. for 5 min.; and (5) second heating (from 30° C. to 300° C. at 20° C./min.). As a result, Tm observed during the second heating was 269° C.

EXAMPLES 2 TO 5

The procedure in Example 1 (2) was repeated to prepare copolymers except that each styrenic monomer as listed in Table 1 was used in place of p-aminostyrene. The results are given in Table 1.

TABLE 1

|  | Strenic monomer (IV) | Yield (g) | MEK insoluble portion (wt %) | Melting point (°C.) | Content of monomer (IV) (mol %) |
| --- | --- | --- | --- | --- | --- |
| Example 2[2)] | dibromostyrene[1)] | 45 | 94 | 269 | 5.2[4)] |
| Example 3 | p-vinylbenzoic acid | 43 | 98 | 269 | 1.0 |
| Example 4 | ethyl-p-vinyl benzoate | 41 | 98 | 269 | 0.9 |

TABLE 1-continued

|  | Strenic monomer (IV) | Yield (g) | MEK insoluble portion (wt %) | Melting point (°C.) | Content of monomer (IV) (mol %) |
|---|---|---|---|---|---|
| Example 5[3)] | p-methoxystyrene | 44 | 97 | 270 | 7.6 |

Remarks
[1)]monobromostyrene 5 mol %, dibromostyrene 84.5 mol % and tribromosytene 10.5 mol %.
[2)]reaction time of 30 min. after addition of dibromostyrene.
[3)]reaction time of 40 min. after addition of p-methoxystyrene
[4)]bromine content (% by weight)

EXAMPLES 6 TO 8

The procedure in Example 1 (2) was repeated to prepare copolymers except that each styrenic monomers as listed in Table 2 was used in place of styrene. The results are given in Table 2.

TABLE 2

|  | Styrenic monomer (III) | | Yield (g) | MEK insoluble portion (wt %) | melting point (°C.) | Content of p-aminostyrene (mol %) |
|---|---|---|---|---|---|---|
|  | type | charge (g) | | | | |
| Example 6 | p-phenylstyrene | 40 | 27 | 98 | 352[1)] | 1.2 |
| Example 7 | p-metbylstyrene | 90 | 37 | 97 | — | 1.0 |
| Example 8 | P-methylstyrene styrene | 5 85 | 45 | 98 | 254 | 0.8 |

Remarks
[1)]Melting point as observed in DSC first heating (30 to 400° C.) that was described in Example 1 (2).

EXAMPLE 9 (Resin composition)

In a 100 ml laboplastmill (produced by Toyo Seiki Co., Ltd.) were placed 3 g of styrenic block copolymer as prepared in Example 1 (2), 3 g of maleic anhydride-modified isotactic polypropylene (2.1% by weight of acid addition, produced by Idemitsu Petrochemical Co., Ltd.), 50 g syndiotactic polystyrene (weight-average molecular weight of 430,000) and 20 g of isotactic polypropylene (produced by Idemitsu Petrochemical Co., Ltd., Model No. 200ST), and the mixture was melt kneaded at 280° C. and 50 rpm for 8 min.

As the result of observation for the enlarged photograph of the rupture cross-section of the composition thus produced, the resin compatibility was markedly improved as compared with the polymer without the addition of the styrenic block copolymer.

EXAMPLE 10 (Resin composition)

A resin composition was produced in the same manner as in Example 9 by the use of 3 g of the styrenic block copolymer as prepared in Example 4, 50 g of syndiotactic polystyrene (SPS, weight-average molecular weight of 430,000), 20 g of polycarbonate (produced by Idemitsu Petrochemical Co., Ltd., Model No. PCA 2200) and 0.5 g of magnesium methoxide as the catalyst.

The composition thus obtained was remarkably improved in resin compatibility as compared with polymer without the addition of the styrenic block copolymer and was favorable in adhesion between the SPS and the polycarbonate.

EXAMPLE 11 (Multi-layer material)

The styrenic block copolymer prepared in Example 3 in an amount of 0.2 g was interposed between aluminum foils with 50 μm thickness and heated to 300° C., and the molten copolymer with the foils was pressed under 10 kg/cm² pressure to produce a multi-layer material. It exhibited satisfactory adhesiveness as compared with the polymer comprising SPS instead of the styrenic block copolymer.

What is claimed is:

1. A multi-layer material having at least one layer comprising a styrenic block copolymer having a reduced viscosity of 0.01 to 20 dl/g as measured at a concentration of 0.05 g/dl in 1,2,4-trichlorobenzene at 135° C., which comprises at least one (A) structural unit represented by the formula

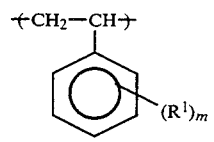

wherein $R^1$ is a hydrogen atom, a halogen atom or a substituent having at least one atom selected from carbon, tin and silicon and may form a condensed ring together with a benzene ring, m is an integer from 1 to 5 and when m is 2 or more, each $R^1$ may be the same or different, the stereoregularity of the main chain of said structural units being highly syndiotactic; and at least one (B) structural unit represented by the formula

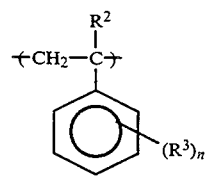

wherein $R^2$ is a hydrogen atom, a halogen atom or a hydrocarbon radical having 1 to 8 carbon atoms, $R^3$ is a heteroatom or a group containing a heteroatom, n is an integer from 1 to 5 and when n is 2 or more, each $R^3$ may be the same or different, said structural unit (B) being different from the structural unit (A) and contained in an amount of $10^{-4}$ to 10 mol %.

2. The multi-layer material as claimed in claim 1, wherein $R^3$ in the structural unit (B) is selected from the group consisting of an oxygen atom, a nitrogen atom, a sulfur atom, a phosphorous atom, a bromine atom and a substituent having at least one of said atoms.

3. A resin composition which comprises (Y) a styrenic block copolymer having a reduced viscosity of 0.01 to 20 dl/g as measured at a concentration of 0.05 g/dl in 1,2,4-trichlorobenzene at 135° C. which comprises at least one (A) structural unit represented by the formula

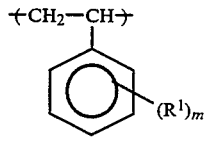

wherein $R^1$ is a hydrogen atom, a halogen atom or a substituent having at least one atom selected from carbon, tin and silicon and may form a condensed ring together with a benzene ring, m is an integer from 1 to 5 and when m is 2 or more, each $R^1$ may be the same or different, the stereoregularity of the main chain of said structural units being highly syndiotactic; and at least one (B) structural unit represented by the formula

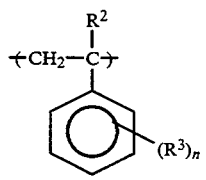

wherein $R^2$ is a hydrogen atom, a halogen atom or a hydrocarbon radical having 1 to 8 carbon atoms, $R^3$ is a heteroatom or a group containing a heteroatom, n is an integer from 1 to 5 and when n is 2 or more, each $R^3$ may be the same or different, said structural unit (B) being different from the structural unit (A) and contained in an amount of $10^{-4}$ to 10 mol % and (Z) at least one member selected from among a thermoplastic resin, an inorganic filler and an organic filler.

4. The resin composition as claimed in claim 3, wherein $R^3$ in the structural unit (B) is selected from the group consisting of an oxygen atom, a nitrogen atom, a sulfur atom, a phosphorous atom, a bromine atom and a substituent having at least one of said atoms.

5. A multi-layer material which comprises at least one layer composed of the resin composition as set forth in claim 4.

6. A multi-layer material which comprises at least one layer composed of the resin composition as set forth in claim 3.

7. A process for producing a styrenic block copolymer having a reduced viscosity of 0.01 to 20 dl/g as measured at a concentration of 0.05 g/dl in 1,2,4-trichlorobenzene at 135° C. which comprises polymerizing at least one styrenic monomer represented by the formula

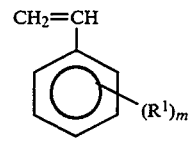

wherein $R^1$ is a hydrogen atom, a halogen atom or a substituent having at least one atom selected from carbon, tin and silicon and may form a condensed ring together with a benzene ring, m is an integer from I to 5 and when m is 2 or more, each $R^1$ may be the same or different, in the presence of a catalyst comprising as principal components (1) a transition metal compound and (b) an aluminoxane; or (2) (a) a transition metal compound and (c) a compound capable of reacting with said transition metal compound to form an ionic complex, to substantially form a polymer having highly syndiotactic stereoregularity; and subsequently reacting said polymer with at least one styrenic monomer which is different from the preceding monomer and represented by the formula

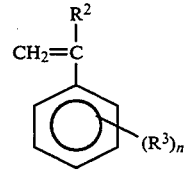

wherein $R^2$ is a hydrogen atom, a halogen atom or a hydrocarbon radical having 1 to 8 carbon atoms, $R^3$ is a heteroatom or a group containing a heteroatom, n is an integer from 1 to 5 and when n is 2 or more, each $R^3$ may be the same or different to proceed with copolymerization reaction.

8. The process according to claim 7, wherein $R^3$ is selected from the group consisting of an oxygen atom, a nitrogen atom, a sulfur atom, a phosphorus atom, a bromine atom and a substituent having at least one of said atoms.

* * * * *